United States Patent [19]

Studer

[11] 4,405,286
[45] Sep. 20, 1983

[54] ACTIVELY SUSPENDED COUNTER-ROTATING MACHINE

[75] Inventor: Philip A. Studer, Silver Spring, Md.

[73] Assignee: The United States of America as represented by the Administrator of the National Aeronautics and Space Administration, Washington, D.C.

[21] Appl. No.: 341,383

[22] Filed: Jan. 21, 1982

[51] Int. Cl.$^3$ .................. F16C 35/00; F04B 49/06; F04B 49/00; F04C 2/16
[52] U.S. Cl. .................... 417/1; 418/194; 418/201; 308/10
[58] Field of Search .............. 417/1; 418/194, 201; 308/10

[56] References Cited

U.S. PATENT DOCUMENTS

| | | | |
|---|---|---|---|
| 3,116,871 | 1/1964 | Mishina et al. | 418/194 |
| 3,180,559 | 4/1965 | Boyd | 418/194 |
| 3,565,495 | 2/1971 | Lyman | 308/10 |
| 3,694,041 | 9/1972 | Studer | 308/10 |
| 3,747,998 | 7/1973 | Klein et al. | 308/10 |
| 3,749,528 | 7/1973 | Rousseau et al. | 417/424 |
| 3,759,626 | 9/1973 | Becker | 415/90 |
| 3,771,909 | 11/1973 | Rousseau et al. | 417/424 |
| 3,778,122 | 12/1973 | Doll | 308/10 |
| 3,814,557 | 6/1974 | Volz | 418/197 |
| 3,823,990 | 7/1974 | Gilinson, Jr. | 308/10 |
| 3,860,300 | 1/1975 | Lyman | 308/10 |
| 3,865,442 | 2/1975 | Studer | 308/10 |
| 3,933,416 | 1/1976 | Donelian | 417/354 |
| 4,000,929 | 1/1977 | Studer | 308/10 |
| 4,036,565 | 7/1977 | Becker | 417/420 |
| 4,057,369 | 11/1977 | Isenberg et al. | 417/365 |
| 4,077,678 | 3/1978 | Studer | 308/10 |
| 4,119,392 | 10/1978 | Breckheimer | 418/201 |
| 4,154,489 | 5/1979 | Lyman | 308/10 |
| 4,245,869 | 1/1981 | Schaeffer | 308/10 |
| 4,340,261 | 7/1982 | Wehde | 308/10 |

OTHER PUBLICATIONS

Magnetic Bearings for Instruments in the Space Environment, Philip A. Studer, NASA Report No. TM 78048, Jan. 1978.
Design and Development of a Momentum Wheel with Magnetic Bearings, Leo J. Veillette, 8th Aerospace Mechanisms Symposium, NASA Report No. TM X-2934, Oct. 1973.

*Primary Examiner*—William L. Freeh
*Attorney, Agent, or Firm*—Robert E. Bushnell; John R. Manning; John O. Tresansky

[57] ABSTRACT

A counter-rotating machine, such as a positive displacement pump having a pair of meshed, non-contacting helical screws (10,12), subjects its rotating members to axial and radial thrust forces when used for such purposes as compression of liquid or gaseous phase fluids while transporting them through a pump cavity (11,13). Each helical screw (10,12) has a shaft (17,17') which is actively suspended at opposite ends (11a,11b) of the pump cavity by a servo-controlled magnetic bearing assembly (19) and a servo-controlled rotary drive motor (20). Both bearing assemblies and drive motors are mounted on the outside of the pump cavity (11,13). Opto-electric angular position sensors (250) provide synchronization between radial orientation of the drive motors. The bearing assemblies and drive motors conjugately provide axial stabilization and radial centering of the helical screws during volumetric compression of aspirated liquid or gaseous phase fluids.

15 Claims, 14 Drawing Figures

0
ACTIVELY SUSPENDED COUNTER-ROTATING MACHINE

ORIGIN OF THE INVENTION

The invention described herein was made by an employee of the U.S. government and may be manufactured and used by or for the Government for governmental purposes without the payment of any royalties thereon or therefor.

TECHNICAL FIELD

This invention relates to counter-rotating machinery and, more particularly, to actively suspended, counter-rotating machinery.

BACKGROUND ART

Counter-rotating machinery such as rotary pumps typically include one or more rotatable members such as impellers or screws mounted with very close clearances inside a cavity of the pump casing on shafts driven by a common prime mover. During operation, the rotatable members are subjected to rotational drive and axial and radial thrust forces. These forces may be empirically described as a dynamic system having six degrees of freedom. These are radial position of the member with respect to mutually orthogonal X and Y axes, axial position of the member along its longitudinal or Z axis, tilting of the member with respect to the X or Y axes (elevation and azimuth of the shaft), and rotation of the member about its longitudinal axis. The efficiency of a rotary pump depends upon friction free rotation of the shafts and maintenance of very close tolerances between the rotatable members and the walls of the pump cavity. Friction free rotation is, in turn, dependent upon minimization of restraint upon rotation of a shaft about its longitudinal axis while maintenance of very close tolerances is dependent upon maximization of restraint upon (indexing) the first five degrees of freedom. Usually, various combinations of dynamic shaft seals and shaft contacting bearings such as glide rings, slip rings or ball and race type bearings are selected to satisfy both of these requirements.

Shaft contacting type bearings require lubrication. Lubricants, however, produce molecular vapors at high shaft rotation speeds, e.g., above 10,000 rpm, which degrade the purity of a fluid passing through a pump. Recently, various configurations of permanent and electromagnets have been proposed as lubricant free substitutes for shaft contacting bearings at speeds in excess of 10,000 rpm. Proposed magnetic bearing designs in the field of rotary pumps have been limited to turbomolecular type rotary pumps where a differential pressure in the field is obtained by transferring kinetic energy from impellers. Differential pressures provided by turbo-molecular type pumps are therefore limited to about 15 psig. Moreover, the proposed designs make no provision for restraining axial thrust forces and therefore necessitate the simultaneous use of either ball bearings, knife-edge ring bearings or discrete magnetic repulsion elements at one or both shaft ends. Consequently, the proposed magnetic bearing designs have little utility in positive displacement type rotary pumps where the axial thrust forces may be large and continuous in magnitude. Furthermore, it is difficult to combine a motor for driving a pump with the proposed magnetic bearing designs because drive motors are usually magnetically discontinuous with rotation while magnetic suspensions are preferably made magnetically continuous to reduce eddy current losses.

STATEMENT OF THE INVENTION

Accordingly, it is one object of the present invention to provide an improved counter-rotating machine.

It is another object to provide a counter-rotating machine having active dynamic axial stabilization of rotating machine members.

It is still another object to provide a counter-rotating machine having active radial centering of rotating machine elements.

It is a further object to provide a counter-rotating machine having an integral active rotatable member suspension and source of rotational power.

It is also an object to provide an improved positive displacement type rotary pump for compressing liquid and gaseous phase fluids.

These and other objects are achieved by a machine providing active suspension to counter-rotating members subjected to axial and radial thrust forces during operation. The active suspension is provided by magnetic bearing assemblies and synchronized magnetic suspension drive motors which support opposite extremities of counter-rotating shafts bearing the rotating members in a non-contacting relation. Each magnetic bearing assembly has a plurality of diametrically opposed, permanent magnet mechanisms providing radial shaft suspension and a drive mechanism providing axial shaft alignment. Each drive motor includes a plurality of diametrically opposed coils simultaneously providing the main electromagnetic field and radial suspension of the other shaft end. Similar variable impedance circuits at each end of the shafts sense axial or radial shaft dislocation and provide servo-control regulating axial drive and radial suspension of the shafts thereby enabling the suspension system to function smoothly with minimal power consumption. Position sensors provide synchronization between angular orientation of the drive motors to prevent contact between the elements borne by the counter-rotating shafts.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like numbers indicate the same or similar components, wherein.

DETAILED DESCRIPTION OF THE INVENTION

Figure 1:
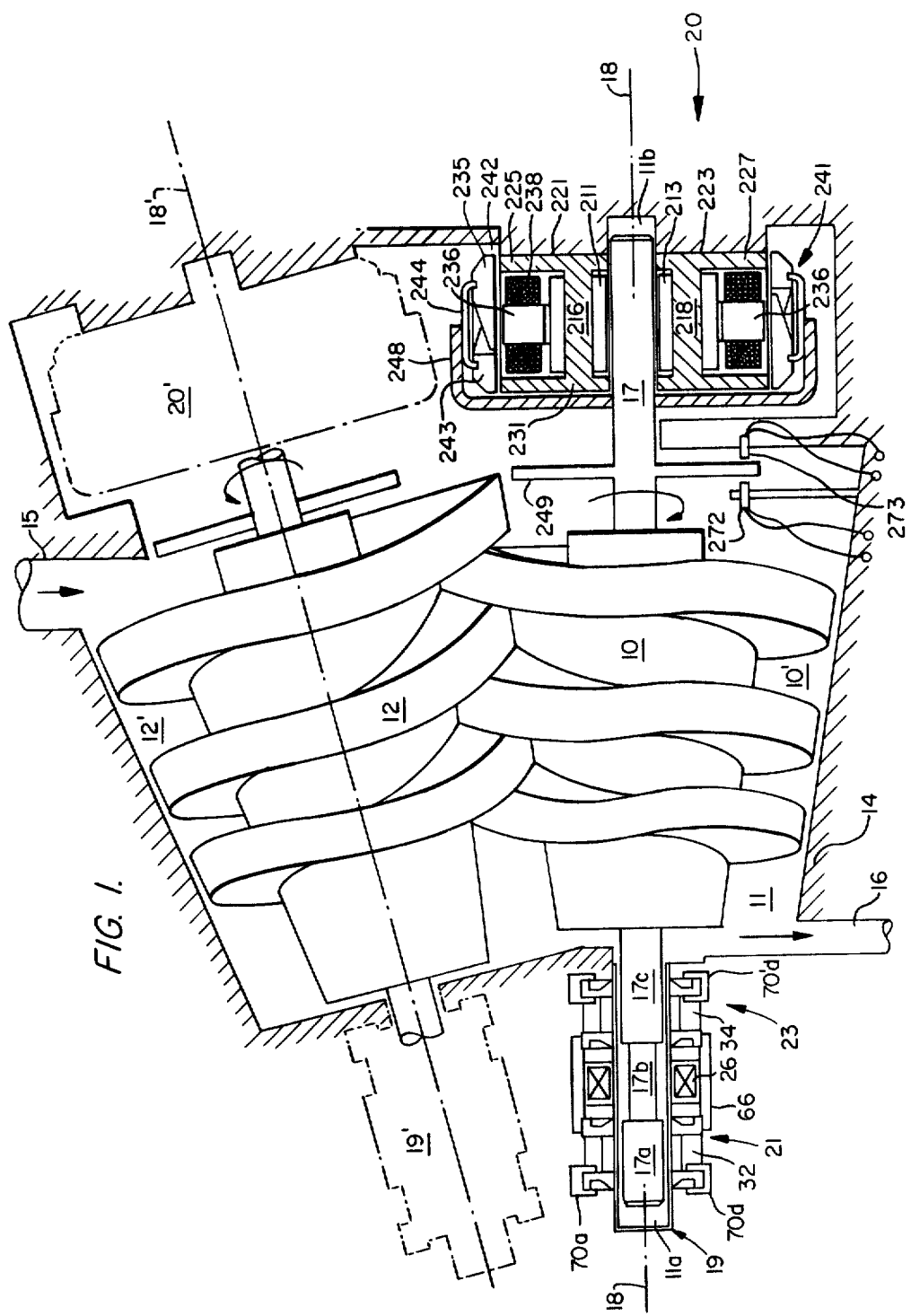
FIG. 1 is a partial front sectional view of an embodiment of a double helical screw rotary pump.

Referring now to the drawings and, in particular, to FIG. 1, the pump according to this invention is shown as having a pair of counter-rotating, linear tapered screws 10, 12 in meshed, non-contacting engagement in their respective intersecting smooth-bore cylindrical cavities 11, 13 of a stationary casing 14. Suitable inlet and discharge ports 15, 16 are located at opposite ends of the screws. Each of helical screws 10, 12 is individually mounted on a shaft 17,17'. Each helical screw is sealed by a close fit with the adjacent interior walls of the casing at both ends and circumferentially. The helical screws have meshed lobes and gullies which independently form open helical channels 10', 12'. Each channel is blocked by an inter-screw seal at points where the lobe of one screw meshes with the gully of the other. These mesh points travel along the lengths of their respective channels during rotation. Compression of a fluid is accomplished in the pump by trapping a charge of the fluid within a channel and then decreasing the volume of the trapped charge as it is carried toward the discharge port 16.

The operational sequence begins as the helical screws mesh at the inlet port 15. A slight subsequent rotation exposes the forward end of a channel to the inlet port and allows the entry of gas into the channel via that port. Further rotation continues the intake of gas as the unmeshed portion of the channel gradually fills with a charge of gas. Just before the mesh point passes the inlet port, the channel is open for a considerable length. Inlet port losses are low because the gas charge is admitted gradually over a large angle of rotation.

Volumetric compression of the aspirated charge begins as the mesh point passes the inlet port. The direction of gas flow during compression is both axial and circumferential. Positive displacement occurs simultaneously with charge transport because the mesh point of the channel and the close fit between the helical screws and the adjacent pump cavity walls confine and gradually reduce the volume of the charge. Meshing between the screws moves the mesh point axially while screw rotation carries the charge radially toward discharge at port 16. Meshing of the helical screws, in effect, creates a series of interlobe volumes. Simultaneously with compression of one charge, subsequent charges are drawn into channels formed at other locations around the circumference of the screws.

The operation and efficiency of a positive displacement type rotary pump depends upon continuous friction-free rotation of the helical screws and maintenance of the clearances between the two screws as well as between the screws and the pump casing 14. Free running and dynamic clearances on the order of 0.001 inches are usually required. Compression and axial transport of a gas charge create variable radial and axial thrust forces, respectively, which, in addition to compressing the gas changes, tend to vary the helical screw clearances. The helical screws are also subjected to rotational drive forces by a prime mover.

Shaft 17 is supported along its longitudinal axis 18 by a coaxially aligned magnetic bearing assembly 19 and a drive motor 20. It may be noted that assembly 19 and motor 20 are shown oversized in comparison to helical screws 10, 12, thereby preventing detailed illustration of the magnetic bearing assembly 19' and drive motor 20' associated with shaft 17'. Those components are shown in outline only. The theory and implementation of the bearing assemblies and drive motors is similar for each of the shafts 17,17', however, so that only the details of the bearing assembly 19 and drive motor 20 need be discussed.

Shaft 17 lies wholly within pump casing 14. The walls of casing 14 extend around opposite ends of shaft 17 to form blind subsidiary cavities 11a and 11b separating bearing assembly 19 and drive motor 20, respectively, from shaft 17. The walls of casing 14 also confine any fluid passing through the pump and thereby prevent interaction between the fluid and the structure of assembly 19 and motor 20. No dynamic seals are therefore required between the helical screw shaft, the surrounding pump casing, the bearing assembly and the drive motor.

Figure 1A:
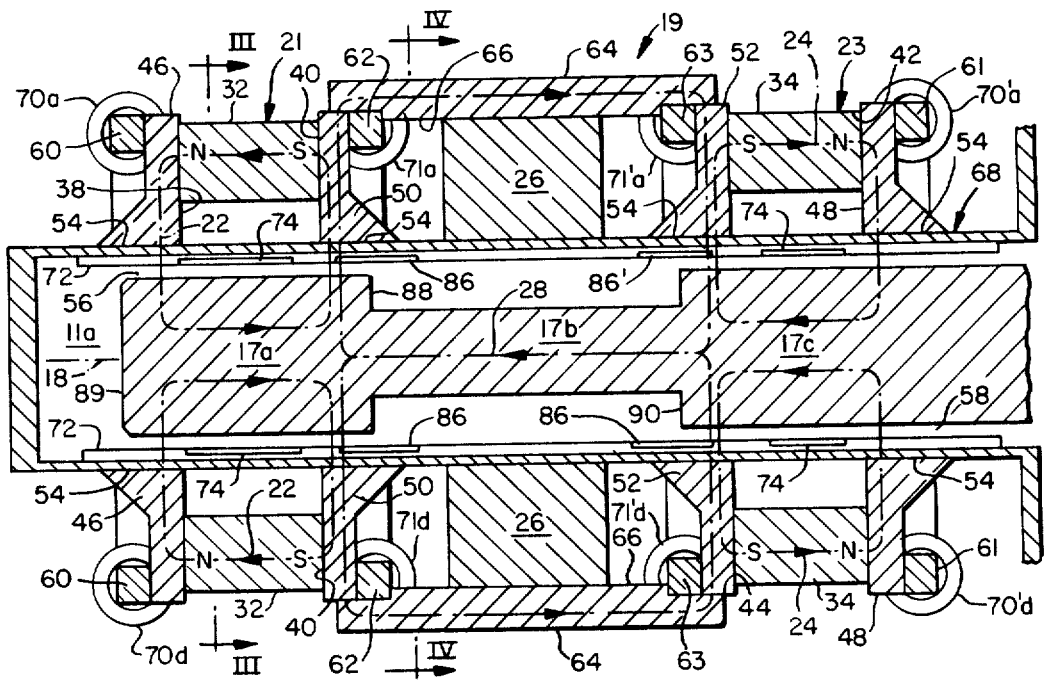
FIG. 1A is a detailed front sectional view of a magnetic bearing assembly shown in FIG. 1.

As more clearly shown in FIG. 1A, the end of shaft 17 adjacent discharge port 16 is axially and radially supported by stationary magnetic bearing assembly 19 coaxially aligned with the longitudinal or Z axis of shaft 17. The distal end of shaft 17, generally cylindrical in shape, has three contiguous sections in proximity to bearing assembly 19: a first end section 17a, an intermediate or center section 17b; and a second end section 17c adjacent to discharge port 16. The two end sections 17a, 17c are approximately of the same diameter as shaft 17 while the center section 17b is of a substantially reduced diameter. Assembly 19 is the subject of copending U.S. patent application Ser. No. 119,336 of common inventorship and assignee herewith. Assembly 19 has two permanent magnet biased bearing mechanisms 21 and 23. Permanent magnet mechanism 21 defines a first set of diametrically opposite magnetic flux paths 22 passing through end section 17a of the shaft. Permanent magnet mechanism 23 defines a second set of diametrically opposite magnetic flux paths 24 passing through end section 17c of shaft 17. An axial drive coil 26 defines a third set of diametrically opposite magnetic flux paths 28 passing through the center portion 17b of shaft 17 and is capable of providing modulation of the magnitude of magnetic flux flowing through the adjoining flux paths 22, 24 thereby subjecting shaft 17 to a net axial force. Magnetic flux passing through sections of shaft 17 tend to create eddy currents detrimental to magnetic operation of the bearing assembly 19. It is desirable, therefore, to make the center and end sections of shaft 17 from discrete laminations of a magnetically permeable material bonded together with a conventional insulating adhesive. End sections 17a, 17c may have a ferrite sheath or ring surrounding their laminations.

Figure 2:
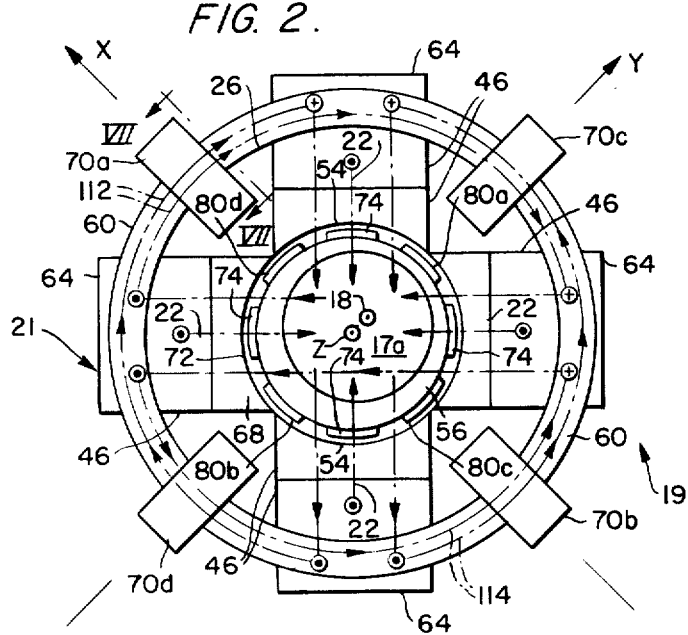
FIG. 2 is an end view of the magnetic bearing assembly shown in FIG. 1A.
Figure 3:
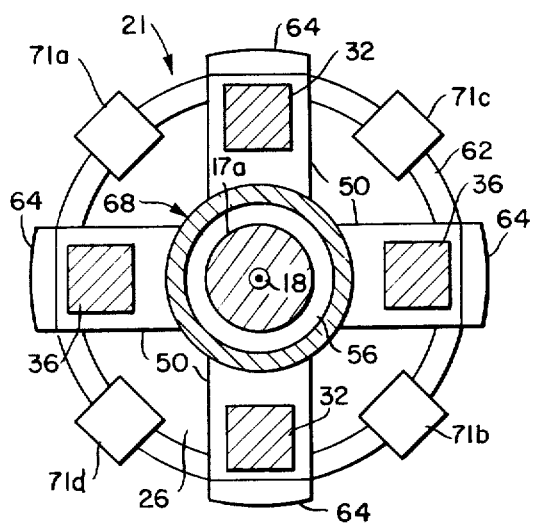
FIG. 3 is a cross-sectional end view of a permanent magnet assembly taken along lines III—III of FIG. 1A.

Referring also to FIGS. 2 and 3, the two permanent magnet mechanisms 21 and 23 each include a first pair of transverse and radially symmetric mounted magnets, 32 and 34, respectively. Permanent magnet mechanisms 21 and 23 also include a second pair of transverse and radially symmetric mounted magnets which are substantially aligned coaxially with the axis of the first pair of magnets. Only the magnet pairs 32, 36 for permanent magnet mechanism 21 is shown in FIG. 3.

For the assembly 19 to function properly, the axially aligned magnets in permanent magnet mechanisms 21 and 23 must be of reverse polarity. As illustrated in FIG. 1A, the magnets in permanent magnet mechanism 21 are orientated so that the north pole is at surface 38 and the south pole is at surface 40. In turn, the magnets in permanent magnet mechanism 23 are oriented so that the north pole is at surface 42 and the south pole is at surface 44.

Permanent magnet mechanisms 21 and 23 each contain magnetically soft end pieces 46, 50, and 48, 52, respectively. Outer end pieces 46 and 48 may be held in place by the north pole of the respective magnets while inner end pieces 50 and 52 may be held in place by the south pole of the respective magnets or by any other conventional attachment. The end pieces preferably are shaped as shown in FIGS. 1A and 2 and extend inwardly toward the longitudinal axis of shaft 17 so that surfaces 54 thereof extend beyond the magnets. Surfaces 54 of end pieces 46 and 50 are spaced from end portion 17a of the shaft to form an intervening gap 56. Surfaces 54 of end pieces 48 and 52 are spaced from end section 17c to form an intervening gap 58. Magnetic flux flows through the end pieces from the magnets thereby introducing eddy currents. To minimize the eddy current effects, it is preferred that the end pieces be made from laminated steel.

Each of permanent magnet mechanisms 21 and 23 includes magnetically soft rings 60, 61, respectively, magnetically coupled to the magnets via the outer periphery of end pieces 46 and 48. Another pair of magnetically soft rings 62, 63 are separately magnetically coupled to the magnets via the outer periphery of each of end pieces 50 and 52. Rings 60-63 are positioned to maintain the spacing of gaps 56 and 58 constant around the sectional ends 17a, 17c of shaft 17.

A plurality of equidistantly spaced magnetically soft bridges 64 interconnect permanent magnet mechanisms 21 and 23 in an axially spaced configuration. Two of four symmetrical bridges 64 spanning between end pieces 50 and 52 are shown in FIG. 1A. The bridges are coupled to end pieces 50 and 52 and rings 62, 63 by the magnets in the permanent magnet mechanisms 21 and 23 or by any other conventional mechanical attachment. Magnetic flux flowing through the bridges will introduce eddy currents which may be minimized by making the bridges of laminated steel.

Figure 4:
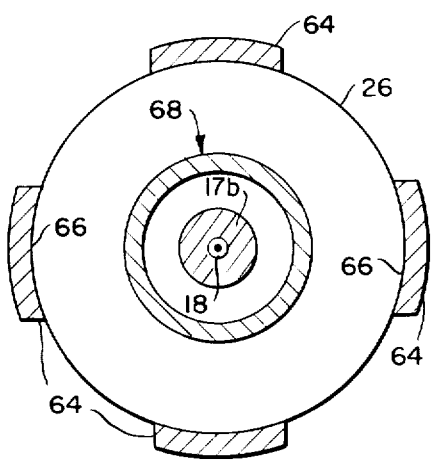
FIG. 4 is a cross-sectional end view of a drive coil assembly taken along lines IV—IV of FIG. 1A.

Referring also to FIGS. 3 and 4, drive coil 26 surrounds center section 17b between end pieces 50 and 52. Preferably, the drive coil has an other diameter substantially the same as the diameter between opposed inner surfaces 66 of bridges 64. Thus, coil 26 is centered around section 17b. The inner diameter of coil 26 is preferably substantially the same as the diameter between surfaces 54 of end pieces 50 and 52.

The magnetic flux path 22 produced by permanent magnet mechanism 21 extends from the north pole surface 38 of magnets 32, radially inwardly through end pieces 46, across gap 56 axially through end section 17a, back across the gap, and radially outwardly through end pieces 50 into the south pole surface 40 of magnets 32. The magnetic flux path 24 produced by permanent magnet mechanism 23 extends from the north pole surface 42 of magnets 34, radially inwardly through end pieces 48, across gap 58, axially through end section 17c, back across the gap, and radially outwardly through end pieces 52 into the south pole surface 44 of magnets 34. Although the two magnetic flux paths are illustrated only through the first pairs of magnets 32 and 34 of the permanent magnet mechanisms 21 and 23, it should be understood that the first and second flux paths also extend in the same manner through the second pairs of magnets in each of the permanent magnet mechanisms.

The third magnetic flux path 28 extends in either the clockwise or counterclockwise direction depending on the direction of the current flow in drive coil 26. For discussion purposes the third magnetic flux path is assumed to be in the direction shown in FIG. 1A.

The third magnetic flux path 28 extends axially through center section 17b, into end section 17a, outwardly across gap 56, through end pieces 50, axially through magnetic bridges 64, inwardly through end pieces 52, across gap 58, into end section 17c and back into the center section 17b.

The preferred manner of restraining translation and tilt of helical screws 10, 12 is to radially suspend their shafts 17,17' axially centered between surfaces 54 of end pieces 46, 48, 50, and 52 in their respective magnetic bearing assemblies. This is accomplished by the use of sensing circuits, generally designated 68 in FIG. 5, which detect changes of an electrical characteristic such as a capacitive impedance when a change in gap distance occurs between surfaces 54 of the end pieces and shaft end sections 17a, 17c. The sensing circuits also detect changes in any capacitive impedance due to axial movement of the shafts. The sensing circuits therefore provide both radial and axial indexing of the shafts without any contact between the shafts and their respective magnetic bearing assemblies. The sensing circuit for each shaft is coupled to a plurality of suspension coils 70a-70d, 70a'-70d', 71a-71d, and 71a'-71d' wound around rings 60, 61, 62 and 63, respectively. Diametrically opposed suspension coils may then selectively modulate the permanent magnetic flux in flux paths 22, 24 shown in FIGS. 1A and 2 in response to radial translation of the sectional shaft end 17a-17c. The sensing circuit also drives coil 26 so that the electrical current flowing in the drive coil may be varied to apply an axial force in either direction to the sectional shaft end thereby assuring axial alignment between the shafts and non-contact meshing of the helical screws. The axial drive coil 26 may also be used to control or vary the clearance between a helical screw and the adjacent interior wall of the pump casing. In effect, the suspension circuits complement the radial suspension and axial drive mechanisms, thereby permitting the suspension system to use smaller components and a lower degree of radial and axial stiffness than ordinarily required to counter radial and axial thrust forces experienced by shafts in a counter-rotating machinery such as rotary positive displacement type pumps.

Figure 5:
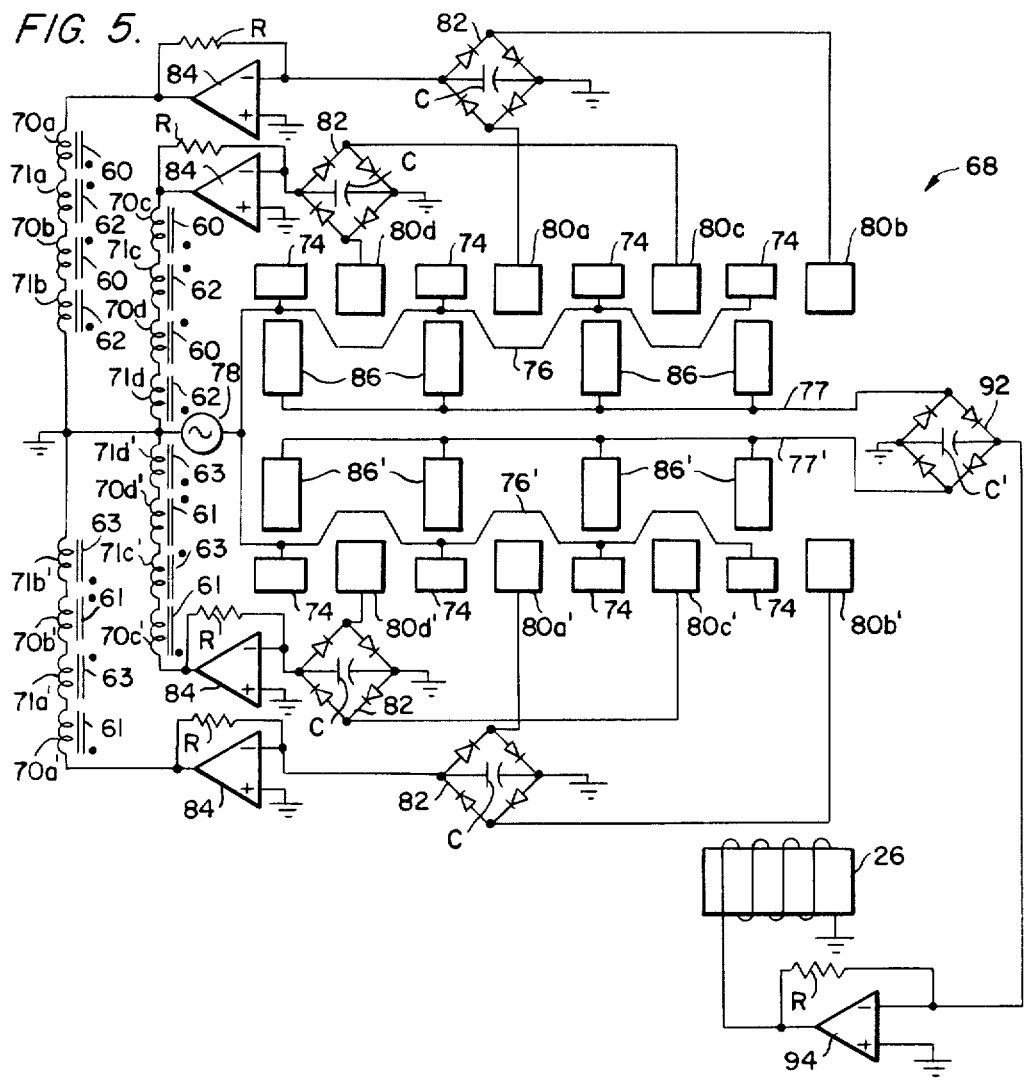
FIG. 5 is a schematic diagram of a shaft position sensing servo-control circuit.
Figure 6:
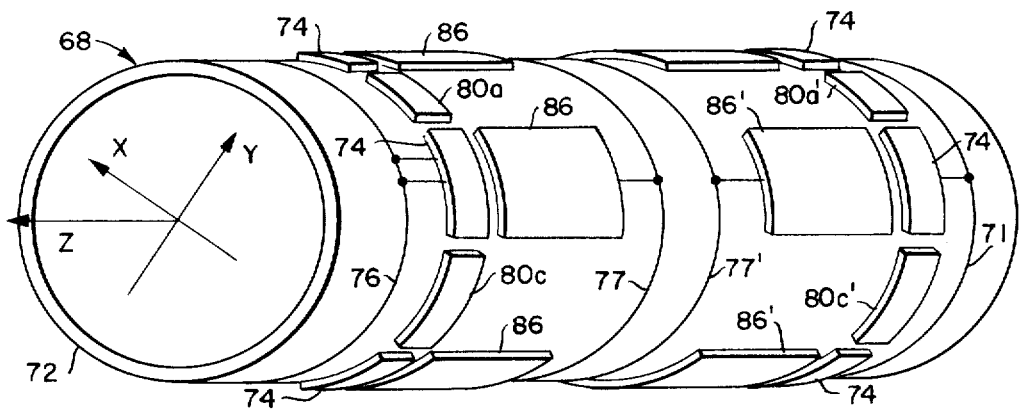
FIG. 6 is a perspective view of an array of capacitive sensing electrodes.

FIGS. 1A, 5 and 6 show shaft position sensing servo-control circuit 68 as having a hollow cylindrical substrate 72 formed of an electrically non-conducting material such as Teflon. Substrate 72 surrounds the sectional ends of shaft 17 within gaps 56 and 58. The diameter of the inner surface of substrate 72 is made substantially greater than the outer diameter of end sections 17a and 17c to preserve air gaps 56 and 58. A plurality of metallic, non-inductive electrode plates 74 are formed in two circumferential sets around the outer surface of substrate 72. One set of electrodes 74 is positioned midway between the ends 88, 89 of shaft section 17a and the other set circumscribes the substrate 72 mid-way along shaft section 17c between surfaces 54 of end pieces 48, 52 when shaft 17 is in its neutral axial position. Electrodes 74 are all electrically coupled by parallel conductors 76,76' etched on the surface of substrate 72. One end of each of conductors 76,76' is connectable to a conventional signal generator 78 capable of providing an alternating wave signal of small voltage at a frequency on the order of one mega-Hertz. The sensing circuit also includes a plurality of metallic, non-inductive capacitor plates formed in two sets 80a–80d and 80a'–80d' in two arrays circumferentially interleaved between the two sets of electrodes 74. Diametrically opposed pairs of capacitor plates, 80a–80b, 80c–80d, 80a'–80b', and 80c'–80d' in each array are connected across diode decoder bridges 82. Each of the diametrically opposed pairs of capacitor plates is aligned with one of the mutually orthogonal X and Y axes. As the sectional end of shaft 17 moves with respect to either axis, either due to radial translation or tilt, the radial separation between individual plates and ferromagnetic shaft 17 changes for one or more pairs of diametrically opposed pairs of capacitor plates 80a–80d, 80a'–80d'. Any change in radial separation between a capacitor plate and shaft 17 affects the value of the capacitance between the individual plates and the shaft 17; increased separation raises the capacitance while decreased separation lowers the capacitance. Capacitance also exists between individual electrode plates 74 and shaft 17. Radial movement of shaft 17 does not affect the net capacitance of electrodes 74 because they are connected in parallel across shaft 17.

Shaft 17 is an electrical conductor. The separation between electrodes 74 and shaft 17 is a constant capacitive impedance in series with signal generator 78. Separations between shaft 17 and individual electrodes 80a–80d, 80a'–80d' are variable capacitive impedances coupled in series with the constant capacitive impedance of electrodes 74 and shaft 17 and across respective diode decoder bridges 82. An increase in capacitance due to increased separation causes a decrease in capacitive impedance and a concomitant increase in voltage on the corresponding terminal of the respective diode decoder bridge 82 while a decrease in separation causes an increase in capacitance impedance and a concomitant decrease in voltage on the corresponding terminal of the respective diode decoder bridge 82. When the longitudinal axis 18 of shaft 17 is coaxial with the Z axis of sensing circuit 68, the capacitance between individual capacitor plates 80a–80d and 80a'–80d' is equal and there is no voltage differential across the capacitor plate terminals of bridges 82. Any radial movement of the sectional end of shaft 17 from the central Z axis, then, causes a change in capacitance between at least one pair of diametrically opposed capacitor plates and shaft 17 and a voltage differential across at least one of the diode bridges 82.

One of the intermediate terminals of each of diode decoder bridges 82 is connected to a reference potential such as ground. The opposed intermediate terminal of each of bridges 82 supplies a direct current proportional in amplitude to any voltage differential across the bridge to the inverting terminal of one of the differential amplifiers 84. A capacitor C coupled between the intermediate terminals of each of the bridges 82 provides adjustment to compensate for such sources of unbalance as parasitic capacitance between adjacent plates 80a–80d, 80a'–80d' and electrodes 74. The output terminals of differential amplifiers 84 are coupled in series with different sets of suspension coils 70a–70d, 70a'–70d–, 71a – –1d, and 71a'–71d' in permanent magnet assemblies 21 and 23. Each differential amplifier 84 amplifies any change in the amplitude of direct current supplied by the corresponding bridge 82, thereby regulating the amplitude of direct current flowing through suspension coils 70a–70d, 70a'–70d'', 71a–71d, 71a'–71d'. Resistances R coupled between the inverting terminals and output terminals of each amplifier 84 provides a positive feedback path.

The suspension coils are coupled in sets of equal numbers of series aiding and opposed connected coils between one terminal of signal generator 78 and the output terminals of differential amplifiers 84. Each of the suspension coils is wound annularly around one of the parallel magnetically soft rings 60–63 between end pieces 46, 48, 50 and 52, respectively. The suspension coils on each of the rings 60–63 are arranged in quadrature with sequentially orthogonal longitudinal axes perpendicular to and spaced apart from the Z axis of sensing circuit 68. As shown by FIGS. 1A, 2 and 3, for example, suspension coils 70a–70d are wound around ring 60, coils 71a–71d around ring 62, coils 70a'–70d' around ring 61, and coils 71a'–71d' around ring 63. Each diametrically opposed pair of suspension coils on each of the rings 60–63, is radially aligned with one of the mutually orthogonal X and Y axes of sensing circuit 68. Therefore, each of the sensing coils is also axially aligned with one sensing coil on each of the other rings 60–63. Referring to FIG. 1A for example, sensing coils 70a, 71a, 71a' and 70a' wound around rings 60, 62, 63 and 61, respectively, are in axial alignment. Similarly, coils 70d, 71d, 71d' and 70d', radially separated by ninety degrees of arc from coils 70a, 71a, 71a', and 70a', are also in axial alignment. The radial and axial alignment of the suspension coils determines which coils are coupled in series in each set.

Suspension coils 70a and 70b are wound around ring 60 and are positioned in diametric opposition along one radial axis. Coils 71a and 71b are wound around ring 62 and are also positioned in diametric opposition along the same radial axis. To provide opposed contributions to magnetic flux path 22, diametrically opposed coils 70a–70b and 71a–71b must be coupled in a series opposed relation, as is shown in FIG. 5.

Coils 70a–71a and 70b–71b are axially aligned along parallel axes. Static magnetic flux in adjacent rings 60, 62 of coils 70a, 70b and 71a, 71b assumes opposite polarizations, thus requiring that each pair of axially aligned coils 70a–71a and 70b–71b be coupled in a series opposed relation. When the longitudinal axis 18 of shaft 17 is coaxial with the Z axis of sensing circuit 68, shaft 17 is in its radially neutral position and no current flows through any of the suspension coils. It is apparent then, that any radial change in the separation between end section 17a of shaft 17 and diametrically opposed capacitive plates 80a and 80b affects not only the amplitude and polarity of direct current flowing through suspension coils 70a, 70b, 71a, 71b, but also the relative contribution of polarization and amplitude of magnetic flux created by each of those coils to modulate the magnetic flux created by permanent magnet assembly 21 for suspending shaft 17 within cavity 11a.

Figure 7:
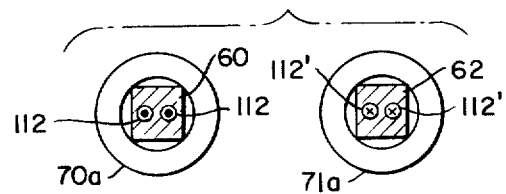
FIG. 7 is a side view taken along lines VII—VII of FIG. 2 showing two suspension coils.

It is preferred that shaft 17 be magnetically suspended in a radially neutral position within cylindrical substrate 72 equally spaced between air gaps 56 and 58 so that the longitudinal axis 18 of the shaft is coaxially aligned with the Z axis of sensing circuit 68. This alignment will protect shaft 17 from frictional forces during rotation. Rotation of shaft 17 causes helical screw 10 to compress and transport charges of aspirated fluid thereby subjecting shaft 17 to radial thrust forces which tend to force shaft 17 from its radially neutral position. FIG. 2 shows the longitudinal axis 18 of end section 17a of the shaft translated along the Y axis so as to be in an off-center position with respect to the Z axis. This results in a decrease in radial separation between capacitive plate 80a and end section 17a with a comcomitant increase in separation between diametrically opposed capacitive plate 80b and end section 17a. These changes in radial separation cause an increase capacitive impedance at plate 80a, a decreased capacitive impedance at plate 80b and application by the respective bridge 82 of a negative potential difference to the inverting terminal of the corresponding differential amplifier 84. In turn, differential amplifier 84 causes a positive direct current to flow through suspension coils 70a, 71a, 70b and 71b. Diametrically opposed coils 70a and 70b, shown in FIG. 2, then produce oppositely polarized magnetic flux paths 112, 114 because they are wound in series opposition. Diametrically opposed coils 71a (shown in FIG. 7) and 71b (not shown) behave in the same manner with the magnetic flux produced by coil 71a having an opposite polarization of the magnetic flux produced by coil 70a. Consequently, magnetic flux in paths 112, 114 travels in opposite directions through part of ring 60, jumps into the end pieces 46, radially traverses air gap 56, passes radially through and section 17a, again traverses air gap 56, travels through the opposite end piece 46, returns to ring 60 and travels through ring 60 in an opposite direction from flux paths 114. Flux paths 112 and 114 flow in parallel aiding relation through all of the quadrants between end pieces 46 and sectional end 17a. Flux paths 112 and 114 are in parallel aiding relation with permanent magnetic flux path 22 in two of these quadrants and in parallel opposing relation in the other two quadrants. The lines of magnetic flux in paths 22, 112 and 114 are parallel between end pieces 46 with the resulting force vectors. The magnitude of the force vectors in each quadrant is proportional to the net strength of the magnetic flux in each quadrant. Consequently, the vector sum of the net magnetic flux strength in each quadrant is proportional to the net repulsion force vector applied by the left half of permanent magnet assembly 21 on end section 17a.

Figure 2A:
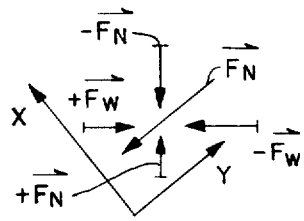
FIG. 2A is a two coordinate force vector graph derived from the lines of magnetic flux shown in FIG. 2.

FIG. 2A graphically represents the magnitude and direction of forces created in four orthogonal quadrants of FIG. 2. Cumulatively, direct current flowing through suspension coils 70a and 70b in response to a decrease in radial separation between capacitive plate 80a and end section 17a modulates the permanent magnetic flux along path 22 via electromagnetic flux paths 112, 114 to produce a net force $F_N$ acting upon end section 17a along the negative Y axis. Net force $F_N$ has a direction and amplitude that is in direct opposition to the radial displacement of end section 17 caused by radial thrust forces. Force $F_N$ acts, therefore, to realign the longitudinal axis 18 of the shaft with the Z axis of sensing circuit 68.

The same direct current which energizes coils 70a, 70b simultaneously flows through coils 71a, 71b wound around parallel ring 62. Static magnetic flux in ring 62 is oppositely polarized from that in ring 60. Coils 71a, 71b are wound oppositely from their axially aligned counterparts, coils 70a, 70b, respectively. Consequently, coils 71a and 71b also modulate permanent magnetic flux along flux path 22 simultaneously with coils 70a and 70b to produce an equal net restoring force upon end section 17a along the negative Y axis. Coils 70c, 70d, 71c, 71d, which are controlled by the relative separations between plates 80c, 80d and end section 17a, make no contribution to the modulation of magnetic flux along path 22 in response to displacement of longitudinal axis 18 along the X axis. Suspension coils 70a', 70b', 71a' and 71b' wound around parallel magnetically soft rings 61 and 63 in permanent magnet assembly 23, are controlled by capacitive plates 80a', 80b' and, therefore, are energized to modulate flux along magnetic flux path 24 and thereby create net restoring forces on end section 17c simultaneously with and in the same manner as coils 70a, 70b, 71a and 71b in assembly 21. Coils 70c', 70d', 71c' and 71d' are not responsive to Y axis shaft displacement and are, therefore, not energized in this scenario. If the longitudinal axis 18 is displaced along both the X and Y axis from coaxial alignment with Z axis, the separations between shaft 17 and all of the capacitive plates 80a–80d and 80a'–80d' will be affected, thereby causing energization of all of the suspension coils 70a–70d, 70a'–70d', 71a–71d, and 71a'–71d' in both permanent magnet assemblies 21 and 23.

Sensing circuit 68 also includes a plurality of metallic, non-inductive capactive electrodes 86,86' connected in two sets of equal numbers of parallel electrodes for detecting the axial position of the sectional end of shaft 17 and thereby enabling assembly 19 to stabilize the axial position of shaft 17. One set of electrodes 86 is circumferentially etched on substrate 72 adjacent one set of electrodes 74, and is located substantially centered over end 88 of end section 17a when shaft 17 is in an axially central position. The other set of electrodes 86' is circumferentially etched on substrate 72 adjacent the other set of electrodes 74, substantially centered over end 90 of end section 17c when shaft 17 is in the same position. Electrodes 86,86' surrounding end 88 are connected in parallel to one side of a diode decoder bridge 92 via conductor 77 and the other set of electrodes 86' surrounding end 90 are in parallel to the other side of bridge 92 via conductor 77'. The gaps between capacitive electrodes 86,86' and shaft 17 are variable capacitances. Bridge 92 feeds a conventional differential amplifier 94 which produces a proportional direct current ultimately fed to drive coil 26 to control the amplitude and polarity of current flowing there through.

In the operation of assembly 19 in an axial stabilization mode, axial movement of shaft 17 is based on the principle that an axial force is devloped between end sections 17a, 17c, between which the magnetic flux from magnetic drive coil 26 passes. This axial force is expressed by the equation:

$$F_A = (\pi r \beta^2 g / \mu) \quad (1)$$

where $F_A$ is the axial force to which the shaft is subjected, r is the radius of the end portions of the actuator, $\beta$ is the magnetic intensity, g is the air gap dimension, and $\mu$ is the magnetic permeability of the shaft. The axial force increases in proportion to the air gap dimension.

When shaft 17 is axially centered within assembly 19, the magnetic flux individually flowing in magnetic flux paths 22 and 24 passes into and out of end sections 17a, 17c, respectively, of shaft 17 with no magnetic flux passing through center section 17b. In addition, the magnetic flux flowing in flux path 22 is in the opposite direction to the magnetic flux flowing in flux path 24. When drive coil 26 is energized by differential amplifier 94, magnetic flux flows through flux path 28 through the center portion 17b. If the magnetic flux flowing in section 17b is in the direction indicated by the flux lines in FIG. 1A, the magnetic flux within air gap 56 will be increased because the magnetic flux in flux paths 22 and 28 are flowing in the same direction and will be, therefore, parallel aiding. In turn, the magnetic flux within air gap 58 will be descreased because the magnetic flux flowing in flux path 24 and flux path 28 are flowing in opposite directions and are deductive from each other. The net result is an axial force toward the left in FIG. 1A which propels the shaft in that direction. Upon command by amplifier 94, the current within the drive coil 26 may be reversed, thereby causing magnetic flux to flow in the opposite direction along flux path 28. When this happens, the magnetic flux within air gap 56 is decreased and the magnetic flux within air gap 58 is increased thereby causing an axial force toward the right in FIG. 1A which propels the shaft in that direction. Thus, assembly 19 can be controlled by sensing circuit 68 to produce shaft movement in either axial direction and thereby provide passive axial control of the shaft 17 of helical screw 10. This assures control of the clearance between the lobes and gullies of rotors 10 and 12.

During the axial movement of shaft 17, position sensing circuit 68 continues to monitor the axial position of the shaft through capacitive variation between shaft sections 17a, 17c and electrodes 86, 86'. When the shaft is centered so that the area of the electrodes 86,86' covering end sections 17a,17c are substantially the same, the capacitances sensed by electrodes 86 will be equal and no potential difference will occur across bridge 92. When the shaft is to the left-of-center, however, the area of electrodes 86 surrounding end section 17c will be more than the area of electrodes 86 surrounding end section 17a. Consequently, the sensed capacitances will be unequal and will create a voltage differential across diode decoder bridge 92 thereby providing a direct voltage which is applied to the inverting terminal of differential amplifier 94. If the voltage is above a certain threshold level, a change is produced in current to the drive coil 26. This, in turn, changes the magnetic flux within flux path 28, thereby affecting changes in the force on the shaft which varies the axial position of the shaft. Although the circuit operation has been described with the shaft moving to the left, it should be understood that the circuit operates in the same manner when the shaft is moving to the right.

Gaps 56 and 58 can be made as large as practical; this gap distance is important for radial suspension of shaft 17. The radial instability of the shaft decreases as the gap dimension is made larger and consequently, a large magnetic gap allows the introduction of a non-magnetic wall defining pump cavity 11a between shaft 17 and substrate 72 of position sensing circuit 68. Thus, in a practical sense the shaft and helical screws can be subjected to various influences such as a pressurized environment in a cryogenic refrigerator, or a vacuum while suspension coils 70a-70d, 70a'-70d', 71a-71d and 71a'-71d' are isolated and protected by virtue of their exterion location from the environment inside pump casing 14. Sensing circuit 68 may be surrounded by a protective cylinder (not shown) formed of an electrically insulating material to protect the electrodes from the environment and to align the electrodes with surfaces 54 of the magnetic poles.

It is to be understood that the axial and radial sensing circuit for shaft 17' of screw 12 is identical to circuit 68.

Referring again to FIG. 1 which, in conjunction with the several views of FIGS. 8, 9, 10 and 11, illustrate direct current motor 20, the prime mover of shaft 17, and helical screw 10. Motor 20 is the subject of U.S. Pat. No. 3,694,041 of common inventorship and assignment herewith.

Motor 20 includes four field winding coils 211, 212, 213, 214 symmetrically disposed about a longitudinal axis 17 in spaced quadrature relation to each other. Each of field coils 211-214 is wound in parallel pairs of diametrically opposed pairs 211,213 and 212,214 about a different leg 216, 217, 218, 219, respectively, of four discrete, low magnetic reluctance, iron pole pieces 221, 222, 223, 224. Pole pieces 221-224 are fixedly mounted relative to axis 17. Field windings 211-214 are wound thereon with their longitudinal axes fixedly positioned along lines running parallel to and equidistant from axis 17.

Field windings 211-214 are excited in such a manner that they, in effect, form electromagnets having similarly directed poles. Thus, in FIG. 8, electromagnets formed by field windings 211, 213 have their north poles at the radially outermost portion of legs 216, 218, respectively, so that direct current induced magnetic flux radiates out of the distal ends of legs 216-219 into the upper, radially extending arcuate arms 225-228 of pole pieces 221-224, respectively. Pole pieces 221-224 are positioned symmetrically about a center line perpendicular to axis 17 whereby each pole piece includes top and bottom radially extending, arcuate arms. The bottom arms for pole pieces 221,223, are designated by reference numerals 231,233, respectively. The arcuate, radially extending arms of pole pieces 221-224 are spaced from each other by radially extending air gaps 234 whereby a separate magnetic circuit is provided for each of field windings 211-214.

An annular armature 235 is fixedly mounted on pole pieces 221-224 in gaps outside of field windings 211-214 that extend between the top and bottom of radially extending arms of the different pole pieces. Armature 235 is secured in position by any suitable, non-magnetic material, such as a potting substance. The armative includes a laminated annular, low magnetic reluctance iron core 236 having teeth 237 through which armature winding 238 is wound. Teeth 237 extend in a direction parallel to axis 17 whereby a radially directed flux derived from field windings 211-214 flowing through core 236 can interact with current flowing in windings 238 to produce torque about the longitudinal shaft axis 18 and thereby provide motor action. Armature winding 238 is formed of three separate coils connected to a direct current source (not shown) via a commuator, preferable of the solid state or photoelectric type as disclosed in U.S. Pat. No. 3,569,804, of common inventorship and assignee herewith. The coils of winding 238 are wound on teeth 237 so that the same coil extends through every third tooth and the two intermediate teeth are occupied by the outer two coils.

To couple the magnetic fluxes derived from field windings 211-214 in a radial direction through armature core 236 and enable useful work to be derived from the machine, a rotor 241 is provided. As more clearly shown on FIG. 8, rotor 241 includes a pair of low magnetic reluctance, iron, salient pole pieces 242 and 243 mechanically connected to each other by a non-magnetic binder. As illustrated in the perspective views of FIGS. 10 and 11, each of salient pole pieces 242 and 243 is shaped somewhat like a crown. Pole pieces 242 and 243 respectively include annular segments 245 and 145 from which protrude teeth or salient poles 246 and 247. Between adjacent salient poles of each of pole pieces 242 and 243 gaps are provided into which the salient poles of the other pole piece fit. The circumferential spacing of salient poles 246 and 247 is such that nine teeth of armature 236 are between corresponding segments of adjacent ones of poles 246 or adjacent ones of poles 247, whereby the first coil of winding 238 is aligned with the center of adjacent ones of poles 246. Non-magnetic binder 244 spaces salient poles 246 and 247 so that no parts of pole pieces 242 and 243 are in contact with each other to thereby provide an air gap between the pole pieces. The length of pole pieces 246 and 247 from ring segments 245 and 145 is sufficiently great to extend axially past laminated core 236 and the radial spacing between the core and pole pieces is close enough that the magnetic reluctance between the pole pieces and the core is considerably less than between any adjacent segments of the two pole pieces.

To enable useful energy to be derived from rotor 241, an end ring 248 is fixedly positioned about the outer face of binder 244 so that the ring rotates with the binder and pole pieces 242 and 243. It is to be understood that the radial positions of rotor 241 are stabilized, without bearings, exclusively by the magnetic forces between field windings 211-214 and armature windings 238.

Figure 12:
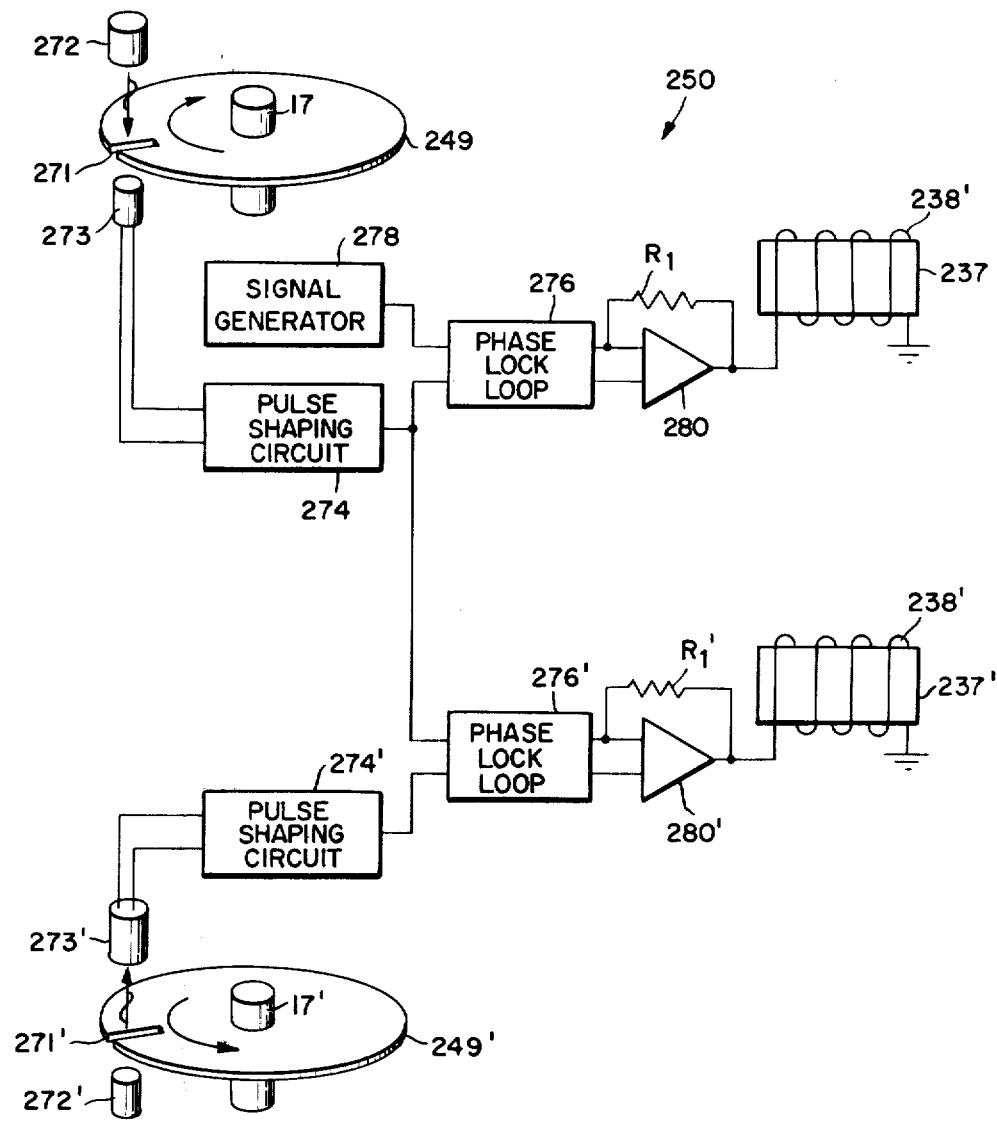
FIG. 12 is a schematic diagram of a shaft encoder sychronization circuit for the drive motor shown in FIG. 1.

FIG. 12 illustrates a circuit 250 for providing brushless, photo-electric synchronization of the angular orientation between armature windings in the drive motors of shafts 17,17'. Synchronization between the drive motors assures maintenance of the clearances between the lobes and gullies of helical screws 10,12 during rotation, and thus protects screws 10,12 from making contact with one another. Each shaft is fitted with an annular flange 249,249' having circumferential strobe slots 271,271'. Aligned with the circumference of each flange is a fixedly mounted photo-detecting assembly including a light source 272,272' and a photo-detector 273,273'. As the slots rotate past their respective light sources and fixed photo-detectors, switching voltages are derived from the photo-detectors and fed to pulse shaping circuits 274,274'. Assigning the master function to shaft 17 and the slave function to shaft 17', the switching voltage derived from photo-detector 273 is fed via pulse shaping circuit 274 to phase lock loops 276,276'. In the commutation circuit for shaft 17, a reference signal generated by a conventional signal generator 278, is also fed to phase lock loop 276. Phase lock loop 276, in turn, controls a differential amplifier 280 which regulates current flow through the three coils of armature winding 238. Similarly, in the slave servo-circuit, the switching voltage derived from photo-detector 273' is fed via pulse shaping circuit 274' to phase lock loop 276', which, in response to the voltage from pulse shaping circuits of the master shaft 17 and slave shaft 17', controls differential amplifier 280' thereby regulating the current flow through the three coils of armature winding 238'. Resistances $R_1$ and $R_1'$ provide positive feedback to differential amplifiers 280,280', respectively, to assure some stability to the synchronization circuit.

Figure 10:
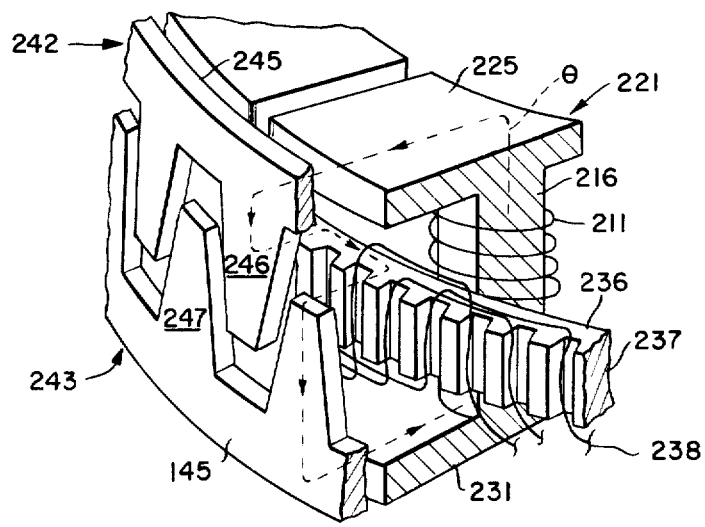
FIG. 10 is a perspective view of a segment of the drive motor illustrated in FIGS. 8 and 9.
Figure 11:
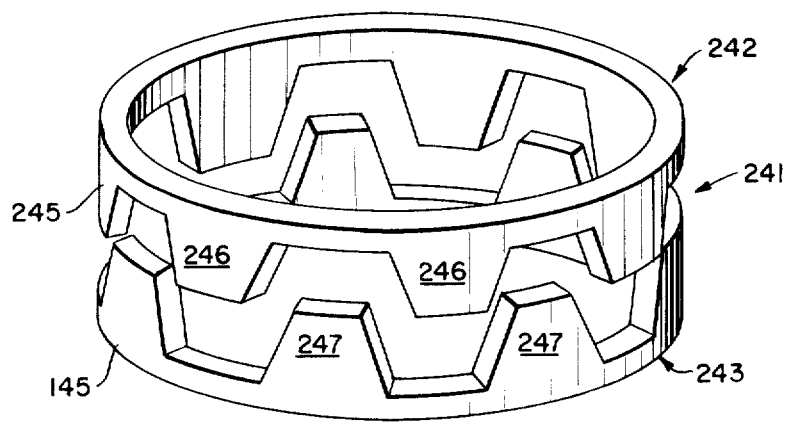
FIG. 11 is a perspective view of the salient poles included in the rotor of FIGS. 8 through 10.

The motor action resulting from the interaction of magnetic flux derived from field winding 211 causes rotation of rotor 241 about the logitudinal axis is generally coincident with the Z axis as best described by reference to the perspective view illustrated in FIG. 10 where it is assumed that winding 211 is energized by a direct current source so that magnetic flux flows from the top of leg 216. The magnetic flux flowing from the top of leg 216 enters radially extending arm 215, in which it flows outwardly in a radial direction. At the outer edge of arm 225, the magnetic flux jumps an air gap between the outer periphery of arm 225 and ring segment 245 of pole piece 242. The flux entering ring segment 245 from arm 225 has a tendency to be distributed equally along the entire circumference of the ring and thereby has a tendency to flow into each of the salient pole 246 of pole piece 242. Magnetic flux in pole piece 242, in fact, only enters the salient poles 246 which are in an arc subtended by the outer periphery of arm 225; any flux having a tendency to enter other salient poles on pole piece 242 does not do so because there is no low magnetic reluctance path provided therefor back to the lower end of leg 216. After the flux flows downwardly in salient poles 246, it turns 90° and is directed inwardly toward axis 18 to jump a relatively narrow air gap into laminated core 236 of armature 235. The flux flows into armature core 235, rather than into salient pole piece 243 because salient pole 246 is closer to armature core 236 than to any segment of salient pole 247. The flux flowing radially between salient pole 246 and core 236 interacts with the current in armature winding 238 to produce a torque that has a tendency to drive rotor 241 about its longitudinal axis. The magnetic flux coupled to core 236 flows circumferentially in both directions about the core until it reaches the salient poles 247 adjacent the pole 246 from which it entered core 236. The flux then turns 90° to flow in a radially outward direction across a relatively small air gap into salient poles 247. The magnetic flux 5 flowing into salient poles 247 turns downwardly therein to ring segment 145 of pole piece 243. The flux in ring segment 145 jumps an air gap and flows radially inward to arm 231, at the bottom face of pole 221. The flux flows radially inward in arm 231 to the bottom of leg 216 to complete the magnetic circuit.

The same action occurs between the magnetic fluxes derived from field winding 212-214 as described with regard to field winding 211. Each of the field windings 211-214 produces a magnetic flux that interacts with the current in armature windings 238 over a different quadrant of the armature to cause rotation of rotor 241 about its longitudinal axis and to control rotor radial position as described above.

Figure 8:
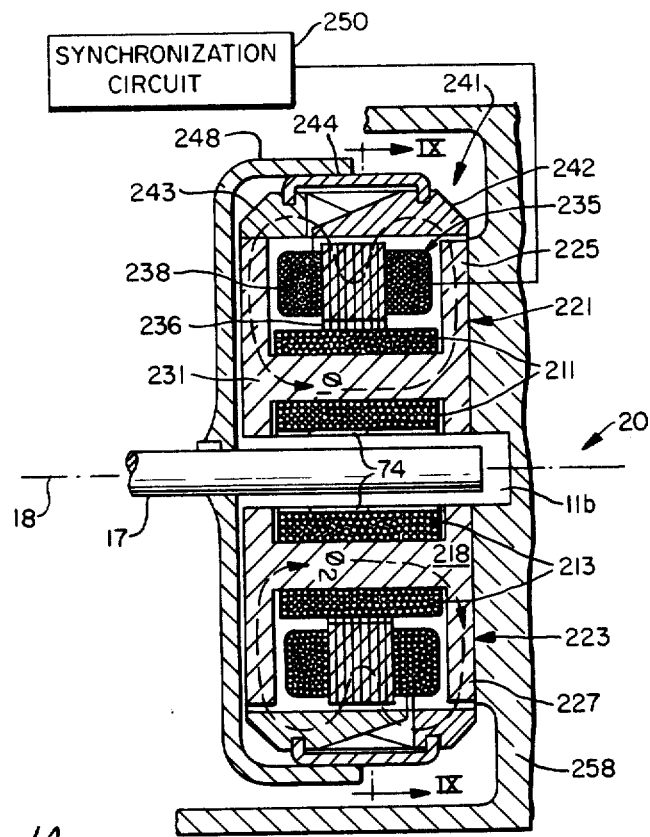
FIG. 8 is a detailed front sectional view of the drive motor shown in FIG. 1.
Figure 9:
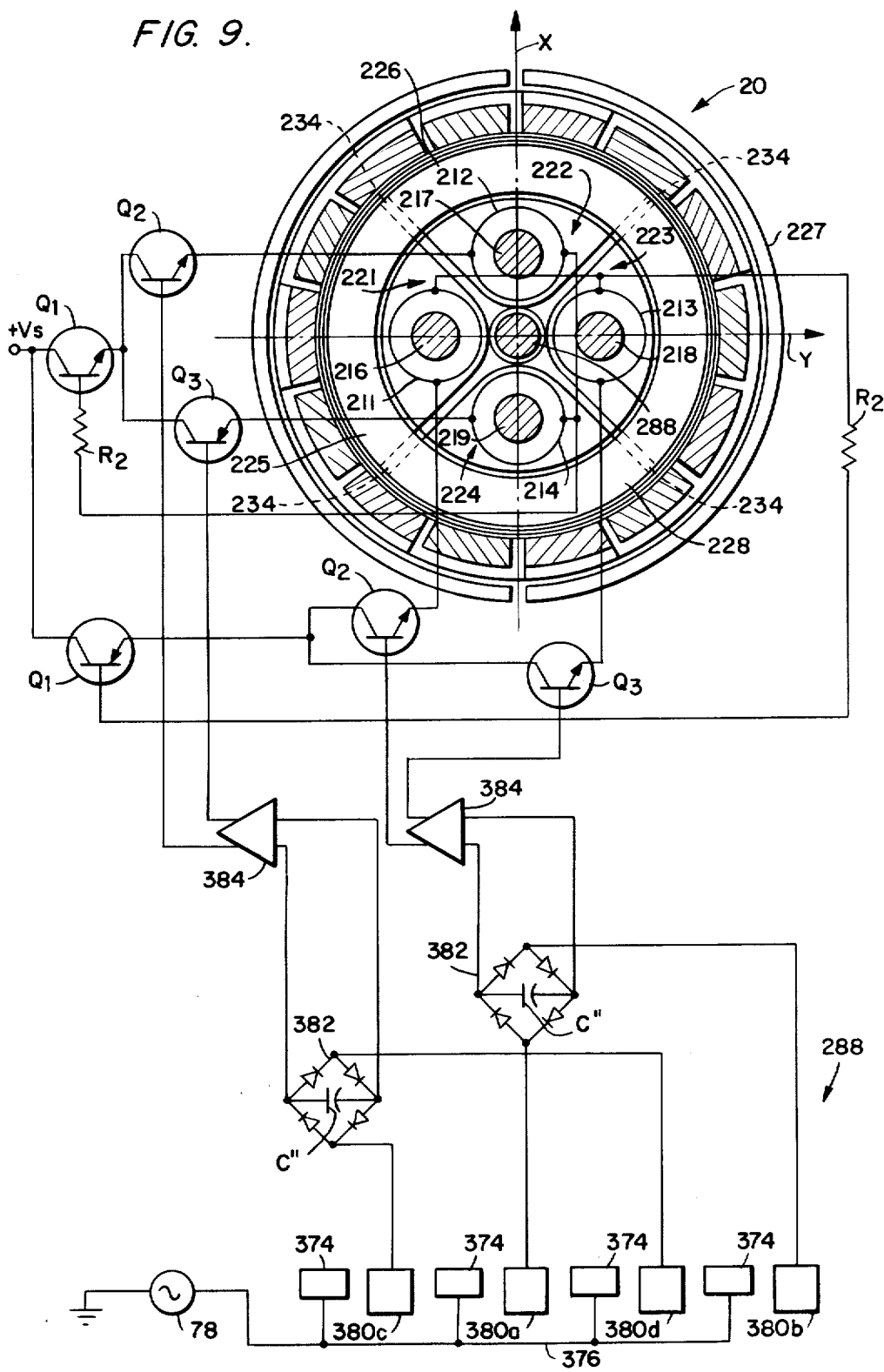
FIG. 9 is a top sectional view along lines IX—IX of the drive motor of FIG. 8.

To detect the radial position of rotor 241 relative to longitudinal axis 18 along the X and Y axes mutually orthogonal to the longitudinal axis 18, a radial position sensing circuit 288 shown in FIG. 9, may be coaxially positioned between the circumferential walls of blind cavity 11b and field winding cores 211-214. Position sensing circuit 288 is similar to the radial part of position sensing circuit 68. In such a configuration, a set of metallic, non-inductive electrodes 374 is circumferentially arrayed around a substrate mid-way between the ends of magnetic cores 216-219 and electrically coupled in parallel by a conductor 376 also etched on the substrate in the manner previously described. A plurality of metallic, non-inductive capacitive plates 380a–380d are etched between adjacent electrodes 374 in diametrically opposed pairs. One end of conductor 376 is attachable to high frequency generator 78. Diametrically opposed pairs of capacitive plates 380a–380d are coupled across rectifying diode decoder bridges 382. The radial position sensing circuit 288 may be coaxially positioned along the Z axis, in proximity to shaft 17. Position sensing circuit 288 is similar to the radial part of position sensing circuit 68. It may be circumferentially located as shown in FIG. 8 between the exterior of shaft 17 and drive motor 20, either inside or outside blind cavity 11b, or inside a hollow shaft 17 (not shown). In either configuration, a set of metallic, non-inductive electrodes 374 is circumferentially arrayed around a substrate mid-way between the ends of magnetic cores 216–219 and electrically coupled in parallel by a conductor 376 etched on the substrate. An array of metallic, non-inductive capacitive plates 380a–380d are arrayed between adjacent electrodes 374 in diametrically opposed pairs 380a–380d. One end of conductor 376 is attachable to high frequency generator 78. Electrodes 374 are fixed capacitive impedances coupled to signal generator 78. The separation between capacitive plates 380a–380d and shaft 17 creates capacitive impedances variable inversely in proportion to their separation from shaft 17. Each diametrically opposed pair of capacitive plates is coupled across one of a pair of diode decoder bridges 382. The bridges provide direct currents to conventional differential amplifiers 384 proportional to any potential difference across the corresponding pairs of diametrically opposed capacitive plates 380a–380b and 380c–380d. A direct voltage source $V_s$ supplies power for the field winding coils 211–214. Transistors $Q_1$ have their collector terminals to voltage source $V_s$ and control the total current through field windings 211–214. The output terminals of differential amplifiers 384 are coupled to the bases of transistors $Q_2$ and $Q_3$ which, in turn, control the relative current flow through individual coils in diametrically opposed pairs of field windings 211,213 and 212,214 in accordance with the differential position signal created by diametrically opposed pairs of capacitive plates 380a–380b and 380c–380d in response to radial translation of shaft 17. Current from diametrically opposed pairs of field windings is applied via resistors $R_2$ to the bases of current control transistors $Q_1$ to provide positive feedback. A difference in the capacitance between diametrically opposite pairs of capacitive plates 380a–380d caused by radial translation of the longitudinal axis of the shaft, in turn, creates a change in the amplitude of electrical current flowing through the corresponding diametrically opposed pairs of field winding coils 211–214. The change in current through diametrically opposed field windings creates a magnetic flux differential and a net radial force which tends to automatically restore the longitudinal axis of the shaft to its equilibrium position.

It is apparent, therefore, that the magnetic bearings and motors of the counter-rotating machine disclosed automatically index the radial and axial locations of the pump's counter-rotating screws without contacting either the screws or the effluent around the screws. The disclosed configuration may be modified to meet the requirements of a particular application without deviating from the principles disclosed. For example, the angle between shafts 17,17' may be increased to provide greater compression or may be decreased to accommodate a larger bearing assembly. Also, screws with parallel rather than skewed axes may be substituted for the helical screws described. The magnetic bearing assemblies 19 may be made with a single permanent magnet mechanism 21 adjoining an axial drive coil, thereby eliminating the second permanent magnet mechanism 23 and providing a savings in size, weight and power. Although magnetic bearing assemblies 19 and motors 20 are described as located on the outside of a pump casing and thereby separated by the casing from any effluent passing through the pump, either or both the bearing assemblies or the drive motors may be positioned inside the pump casing. It may be noted that the pump described may be used to provide volumetric compression of fluids in either a gaseous or liquid phase.

Although the invention is disclosed by application to a rotary positive displacement pump having a pair of helical screws, the principles thereof may also be used to provide friction-free dynamic suspension and rotation to other types of counter-rotating machinery, particularly where close clearance must be maintained between rotatable members in the presence of axial and radial thrust forces. A pulverizer using a pair of counter-rotating mills is an example of such machinery.

I claim:
1. An actively suspended counter-rotating machine, comprising:
   a plurality of shafts (17,17');
   an equal plurality of means (10,12) mounted on said shafts in close, non-contacting fit for subjecting intermediate substances to axial and radial compression during counter-rotation of said shafts;
   an equal plurality of means (19,19') coaxially disposed around one end of said shafts for generating in adjoining sectional lengths (17a, 17c) of said shafts a first plurality of opposed, magnetic flux paths (22, 24) radially penetrating and axially traversing said sectional lengths;
   a plurality of means (211-214, 216-219) symmetrically arrayed around the other end of said shafts for radiating a second plurality of opposed magnetic flux paths (22/24) each traversing central magnetic flux path segments lying within planes passing along the longitudinal axes (18,18') through said shafts;
   an equal plurality of means (237, 238) each coaxially disposed in proximity to said radiating means around said shaft ends for each creating torque about longitudinal axes when energized by electrical currents flowing orthogonally to said central magnetic flux path segments;
   an equal plurality of discrete means (248, 248') affixed to said different shafts ends in conjugate proximity to said central magnetic flux path for converting said torque into counter-rotation of said shafts; and
   means (250) responsive to the angular rotation of said shafts for synchronizing the energization of said plurality of torque creating means (237,238).

2. The machine of claim 1 wherein each of said plurality of generating means (19,19') comprises pluralities of magnetic means symmetrically arrayed about common axes (Z) and separated from said sectional ends (17a,17c) for defining said first plurality of magnetic flux paths (22/24).

3. The machine of claim 2 wherein said pluralities of magnetic means comprise:

pluralities of pairs of transverse and symmetrical magnets (32,34) radially and axially aligned about a common axis (Z) and separated from said sectional lengths (17a,17c); and pluralities of magnetically soft end pieces (46, 48, 50, 52) arranged in axially facing pairs across opposite ends of said magnets and in diametrically opposed pairs separated from said sectional lenths.

4. The machine of claims 2 or 3 further comprising a first plurality of radial control means (68) arrayed with said generating means (19,19) in proximity to said sectional ends (17a,17c) for establishing diametrically opposite differentials in the magnitude of magnetic flux within said first plurality of flux paths (22/24) in response to radial differences between corresponding of said longitudinal (18) and common axes (Z).

5. The machine of claim 4 wherein each of said first plurality of radial control means comprises:

a first plurality of fixed capacitive electrodes (76) connectable to a source of alternating voltage (78), circumferentially arrayed around said sectional lengths (17a,17c); and a first plurality of capacitive plates (80a-80d, 80a'-80d') circumferentially interleaved between said fixed capacitive electrodes and arrayed around and variably spaced apart from said sectional lengths coaxially with a respective one of said common axes (Z).

6. The machine of claim 5 wherein each of said first plurality of radial control means further comprises:

a plurality of magnetically soft rings (60, 61, 62, 63) coupled to the outer peripheries of said end pieces (46, 48, 50, 52) opposite to said magnets (32, 34);

a plurality of coils (70a-70d, 70a'-70d', 71a-71d, 71a'-71d') wound about each of said rings in an axially symmetric array; and a plurality of circuit means coupled between serially connected sets of said coils and diametrially opposed pairs of said first plurality of capacitive plates for regulating the amplitude and polarity of direct current flowing between said capacitive plates and said sets of coils in response to change between the position of corresponding of said longitudinal (18,18') and common axes (Z).

7. The machine of claim 1 wherein each of said plurality of generating means (19,19') comprises electromagnetic means (26) arranged about said shaft ends for creating a third plurality of magnetic flux paths (28) radially penetrating and axially transversing said shafts adjacent said first plurality of magnetic flux paths (22/24).

8. The machine of claim 7 wherein said electromagnetic means (26) comprises an annular coil would around and radially separated from said shaft ends.

9. The machine of claims 7 or 8 further comprising a plurality of axial control means (68) arrayed with said electromagnetic means in proximity to said shaft for modulating the magnitude of magnetic flux within said third plurality of magnetic flux paths (28) in response to change in axial alignment between corresponding of said electromagnetic means and said sectional ends.

10. The machine of claim 9 wherein each of said plurality of axial control means (68) comprises a second plurality of capacitive plates (86,86') circumferentially arrayed around and variably spaced apart from edges of said sectional lengths coaxially with a respective one of said common axes (Z).

11. The machine of claim 10 wherein:

said plurality of radiating means (211-214) each comprise pluralities of field windings symmetrically arrayed about mutual axes; and said plurality of torque creating means (248,248') each comprise an armature coil and core positioned intermediate said field windings and said torque converting means.

12. The machine of claim 11 further comprising a second plurality of radial control means arrayed with said field windings (211-214) in proximity to said other shaft ends for establishing diametrically opposite differentials in the magnitude of magnetic flux within said second plurality of flux paths in response to radial differences between corresponding of said longitudinal (18) and mutual axes (Z).

13. The machine of claim 12 wherein each of said second plurality of radial control means comprises:

a second plurality of fixed capacitive electrodes (374) connectable to a source of alternating voltage, circumferentially arrayed around said other shaft ends; and a second plurality of capacitive plates (380a-380d) circumferentially interleaved between said fixed capacitive electrodes and arrayed around and variably spaced apart from said other shaft ends coaxially with a respective one of said mutual axes (Z).

14. A rotary positive displacement pump comprising:

a pump casing (14) having inlet (15) and discharge ports (16);

a plurality of shafts (17,17) having opposite ends extending beyond opposite sides of said casing (14);

an equal plurality of means (10, 12) mounted on said shafts in close, noncontacting meshing fit within said casing for volumetrically compressing a fluid being transported said inlet (15) and discharge (16) ports;

an equal plurality of means (19) coaxially disposed around one end of said shafts (17,17') for generating in adjoining sectional lengths of said shafts a first plurality of opposed, magnetic flux paths (22) radially penetrating and axially traversing said sectional lengths;

a plurality of means (211-214, 216-219) symmetrically arrayed around the other shaft ends for radiating a second plurality of opposed magnetic flux paths each traversing central magnetic flux path segments lying within planes passing along the longitudinal axes through said shafts;

an equal plurality of means (237,238) each coaxially disposed in proximity to said radiating means around said other shaft ends for each creating a torque about said longitudinal axes when energized by electrical currents flowing orthogonally to said central magnetic flux path segments;

an equal plurality of discrete means (241) affixed to said different shaft ends in conjugate proximity to said central magnetic flux path segments for converting said torque into counter-rotation of said shafts, and means (250) responsive to the angular rotation of said shafts for synchronizing the energization of said plurality of torque creating means.

15. A rotary positive displacement pump comprising:

a pair of non-contacting, meshed helical screws (10,12) each having a shaft (17,17') extending from opposite bases;

a pump casing (14) having inlet (15) and discharge (16) ports forming a close, non-contacting fit around said meshed helical screws (10,12);

a pair of magnetic bearing assemblies (19,19') external to said casing supporting different ones of said shafts, each of said magnetic bearing assemblies comprising:
- a plurality of permanent magnets (32,36) aligned in an axially symmetric array separated from a first section (17a) of a shaft extending from one of said bases,
- a plurality of magnetically soft and pieces (46,50) arranged in axially separated pairs adjoining opposite ends (38,40) of said permanent magnets (32) and forming a plurality of axially separated and axially symmetric arrays to define a gap (56) between said end pieces and said first shaft section (17a) thereby providing a first magnetic flux path (22) passing between said axially separated arrays via said first shaft section (17a) and
- coil means (26) defining a second magnetic flux path (28) passing through a section of said shaft (17b) adjoining said first shaft section (17a) for selectively modulating magnetic flux flowing in adjoining flux paths (22) within said shaft (17,17');

a pair of drive motors (20,20') external to said casing (14) supporting the ends of individual ones of said shafts opposite said magnetic bearing assemblies (19,19'), each of said motors comprising:
- a plurality of separate field windings (211-214);
- an armature winding (238);
- means (84) for providing current flow in said field windings;
- means for providing current flow in said armature winding (238); and
- a rotor (235, 243, 244, 248) connected to one of said opposite shaft ends, for coupling flux derived from said field windings (211-214) in an interacting relation with current flowing in said armature winding (238) whereby said rotor is driven relative to said field windings in response to said interaction;

means (288) for sensing the position of said rotor relative to said field windings (211-214); and means (82,84) responsive to said sensing means for controlling the relative amplitudes of current flowing in said field windings (211-214) to maintain said rotor in a predetermined position relative to said field windings; and means (250) for synchronizing said current flow between each said armature (238) winding in said pair of drive motors (20) whereby said helical screws are held in a meshed, non-contacting relation.

* * * * *